(No Model.)
J. W. DAVIS.
STEAM COOKER.
No. 385,794. Patented July 10, 1888.
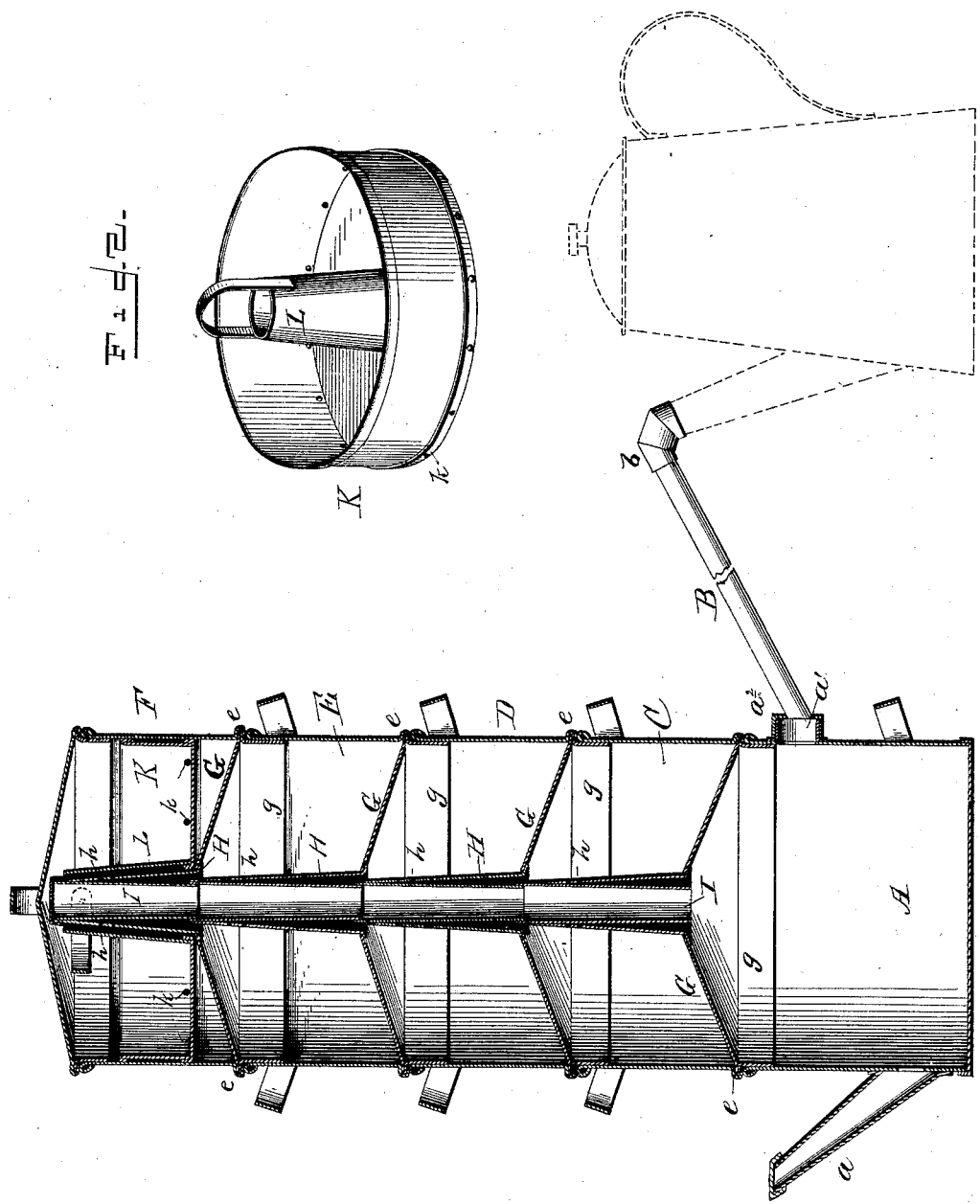
WITNESSES.
G. S. Elliott,
E. W. Johnson.
James W Davis.
INVENTOR,
Attorney.

UNITED STATES PATENT OFFICE.

JAMES W. DAVIS, OF EL DORADO, KANSAS.

STEAM-COOKER.

SPECIFICATION forming part of Letters Patent No. 385,794, dated July 10, 1888.

Application filed July 14, 1887. Serial No. 244,322. (No model.)

*To all whom it may concern:*

Be it known that I, JAMES W. DAVIS, a citizen of the United States of America, residing at El Dorado, in the county of Butler and State of Kansas, have invented certain new and useful Improvements in Steam-Cookers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in steam-cookers, the object of my invention being to provide a cheap, simple, and effective cooker, in which edibles of different kinds can be cooked by steam generated in a vessel, so that they will not impart flavor to each other; and it consists in the construction and combination of the parts, as will be hereinafter fully set forth, and specifically pointed out in the claims.

In the accompanying drawings, which illustrate my invention, Figure 1 is a vertical sectional view of a steam-cooker constructed in accordance with my improvement, in which view I have shown means for utilizing the steam generated in an ordinary cooking-vessel. Fig. 2 is a detail perspective view of a receptacle which may be placed within the cooking-vessels.

A refers to a water-vessel, which may be of ordinary construction, the same being provided with a spout, $a$, which spout has a cover or stopper to prevent steam escaping therefrom. This vessel may also be provided near its upper edge with an opening, $a'$, which has an outwardly-projecting wall, over which a cap, $a^2$, can be placed, so as to connect with said opening a tube, B, which tube is provided at one end with a connection, $b$, for attaching the same to the spout of an ordinary cooking-vessel, (such a cooking-vessel being shown in dotted lines.) When the tube B is not employed, the opening may be covered with an ordinary cap, so as to prevent the egress of steam through the opening.

Upon the upper edge of the vessel A is placed one of my improved steaming-vessels, C, and upon this may rest, one above the other, as many other vessels—as D, E, and F—as may be desired, all the steaming-vessels being of the same construction. Each of the steam-vessels in which the edibles to be cooked are placed is provided with a bottom, G, which inclines from the outer edges of the vessel upwardly, the outer edge of the vessel being provided with a suitable bead, which rests upon the upper edge of the vessel beneath the same. These steaming-vessels have below the outer edges of the bottom G depending flanges $g$, the upper edges of these flanges being bent outwardly, so as to engage with the inner portion of the beading $e$.

Rigidly to the center portion of the inclined bottom of the steaming-vessels are attached tubes H, which taper upwardly, and near the upper portion they are provided with perforations $h$. Within the tubes H, at the upper ends thereof, are suitably secured interior tubes, I, which are cylindrical almost throughout their entire length. The lower ends of these cylindrical tubes I are bent slightly inwardly, so that they will fit snugly in the upper ends of corresponding tubes when the vessels are placed one on top of the other.

By providing the cooking-vessels with inclined bottoms, as shown, the water which is formed by the condensation of the steam will settle in the lower portion of said bottom, so that each of the steam-vessels will have the soldered joints adjacent to the outer edge of the bottoms covered with water, so that the solder connecting the parts cannot be melted; and by providing the steam cooking-vessels with central tubes instead of side tubes said vessels will fit one above the other, no matter how they may be turned axially. The tapering central tube also provides a convenient means for securing the tube rigidly to the bottom, and by having the bottoms G upwardly inclined great rigidity is given to the same in addition to the advantage hereinbefore mentioned.

In practice the central tube of the upper steaming-vessel may be closed by a suitable cap.

When it is desired to steam edibles of different kinds, they may be placed in the different cooking-vessels, and the steam from the vessel A will ascend through the center tubes, so as to thoroughly heat the same. The steam will also escape through the space between the tubes H and I, and pass out of perforations $h$ into and upon the material to be cooked, which is placed within the vessel, and from said vessel it will ascend to the next vessel.

The center tube, I, which is heated by the steam, will cause the steam to be partially heated after circulating in the lower cooking-vessel, and said tube being heated will also prevent to a great extent the condensation of the steam within the space between the inner and outer tubes.

With the steaming vessels constructed as hereinbefore described, I may use a receptacle for the edibles to be cooked, as shown in Fig. 2. This receptacle K is provided near its bottom with a series of perforations, $k$, and centrally with a conical tube, L, which has a pivoted bail or handle attached thereto, said bail or handle being adapted to be swung to one side, as shown in Fig. 1 of the drawings.

When the receptacle shown in Fig. 2 is used, it will rest upon the upper edge of the inclined bottom, so as to provide a water-space beneath the same.

With a steam-cooking apparatus constructed as hereinbefore described, and as shown in the accompanying drawings, different vegetables and meats may be cooked at the same time without imparting the flavor of one to the other, and when it is desired to cook rapidly the steam from another source than that generated in the lower water-vessel A may be used; and by the construction shown the steam, after being used for cooking edibles in one vessel, is not allowed to descend, so as to impart the flavor or odor to the edibles contained in the vessels beneath.

I claim—

1. In a steam-cooker, the combination, with a vessel, A, of one or more steaming-vessels adapted to fit above the same, said vessels being provided with upwardly-inclined bottoms having permanent centrally-arranged conical tubes H, within which are rigidly secured central tubes, I, the conical tubes being perforated near their upper ends, substantially as shown, and for the purpose set forth.

2. The combination, in a food-steamer, of a steam-generating vessel constructed substantially as shown, a steam cooking-vessel having an inclined bottom, an upwardly-projecting conical tube attached to said inclined bottom, and a tube located within said conical tube, a removable vessel, K, having a perforated bottom and an upwardly-projecting center portion to which a pivoted bail is attached, the parts being organized substantially as shown, and for the purpose set forth.

In testimony whereof I affix my signature in presence of two witnesses.

JAMES W. DAVIS.

Witnesses:
B. EDWARDS,
A. J. COSSEY.